US012625720B2

(12) United States Patent
Kasso et al.

(10) Patent No.: US 12,625,720 B2
(45) Date of Patent: May 12, 2026

(54) CLOUD SHELL EXTENSION FRAMEWORK

(71) Applicant: Oracle International Corporation,
Redwood Shores, CA (US)

(72) Inventors: Christopher S. Kasso, Los Altos, CA
(US); John Wells, Scotch Plains, NJ
(US); Linda K. Schneider, San Jose,
CA (US); Jacco Martijn Flenter,
Gouda (NL)

(73) Assignee: Oracle International Corporation,
Redwood Shores, CA (US)

( * ) Notice: Subject to any disclaimer, the term of this
patent is extended or adjusted under 35
U.S.C. 154(b) by 503 days.

(21) Appl. No.: 18/453,627

(22) Filed: Aug. 22, 2023

(65) Prior Publication Data

US 2023/0393884 A1 Dec. 7, 2023

Related U.S. Application Data

(63) Continuation of application No. 17/321,240, filed on
May 14, 2021, now Pat. No. 11,782,748.

(51) Int. Cl.
*G06F 9/455* (2018.01)
*H04L 9/40* (2022.01)
(Continued)

(52) U.S. Cl.
CPC ...... *G06F 9/45558* (2013.01); *H04L 63/0281*
(2013.01); *H04L 63/029* (2013.01);
(Continued)

(58) Field of Classification Search
None
See application file for complete search history.

(56) References Cited

U.S. PATENT DOCUMENTS 10,140,165 B2 * 11/2018 Pathak ............... G06F 9/44526
10,218,734 B2 2/2019 Reddy et al.
(Continued)

FOREIGN PATENT DOCUMENTS

AU 2004279197 A1 8/2005

OTHER PUBLICATIONS

H. Yanagisawa, "Extension of Web-Based Software Development
Environment," 2015 IEEE 29th International Conference on Advanced
Information Networking and Applications Workshops, Gwangju,
Korea (South), 2015, pp. 463-466, doi: 10.1109/WAINA.2015.117.
(Year: 2015).*

(Continued)

*Primary Examiner* — S. Sough
*Assistant Examiner* — Selena Sabah Nahra
(74) *Attorney, Agent, or Firm* — Invoke

(57) ABSTRACT

The present embodiments relate to a cloud shell extension
framework. A cloud infrastructure (CI) service can invoke a
cloud shell from a console to the CI. The service may request
that context data to be added for use in a terminal session.
The cloud shell extension can include a tool or script that can
be used to obtain context data or sample code for preparing
an environment specific to the service prior to the user
interaction with the environment. The cloud shell extension
can allow for a service to register an extension in the cloud
shell framework, and their extension can be invoked when
a client initiates the cloud shell with the service. The
extension can allow for the invoked service to forward
context data, such as environment variables, to be set in the
terminal session for the client.

17 Claims, 10 Drawing Sheets

(51) Int. Cl.

| | |
|---|---|
| *H04L 67/10* | (2022.01) |
| *H04L 67/141* | (2022.01) |
| *H04L 67/60* | (2022.01) |

(52) U.S. Cl.

CPC ............ *H04L 67/10* (2013.01); *H04L 67/141* (2013.01); *H04L 67/60* (2022.05); *G06F 2009/45562* (2013.01); *G06F 2009/45575* (2013.01); *G06F 2009/45595* (2013.01)

(56) References Cited

U.S. PATENT DOCUMENTS

| | | | |
|---|---|---|---|
| 11,010,191 | B1 | 5/2021 | Hornbeck |
| 11,171,824 | B2 | 11/2021 | Jones et al. |
| 2004/0172487 | A1 | 9/2004 | Arpirez et al. |
| 2005/0198648 | A1 | 9/2005 | Wray et al. |
| 2012/0331528 | A1 | 12/2012 | Fu et al. |
| 2015/0373012 | A1 | 12/2015 | Bartz et al. |
| 2017/0006119 | A1 | 1/2017 | Pogrebinsky et al. |
| 2017/0075702 | A1 | 3/2017 | Balz |
| 2018/0217880 | A1 | 8/2018 | Pathak et al. |
| 2018/0276256 | A1 | 9/2018 | Sarkar et al. |
| 2020/0150985 | A1 | 5/2020 | Moghaddam et al. |
| 2020/0301764 | A1 | 9/2020 | Thoresen et al. |
| 2021/0226937 | A1 | 7/2021 | Mathaiyan et al. |
| 2022/0052849 | A1 | 2/2022 | Kasso et al. |
| 2022/0052878 | A1 | 2/2022 | Kasso et al. |
| 2022/0129155 | A1 | 4/2022 | Kasso et al. |
| 2022/0261270 | A1 | 8/2022 | Gizis et al. |

OTHER PUBLICATIONS

Using google cloud shell with VS code | by Alex Burdenko | medium. (Jun. 12, 2020b,). https://medium.com/@alex.burdenko/vs-code-happens-to-be-my-favorite-code-editor-and-ive-been-lucky-to-participate-so-many-diverse-952102856a7a (Year: 2020).*

Hanselman, S. (Dec. 2, 2017,). Azure cloud shell—your own bash shell and container—right inside Visual Studio Code. Azure Cloud Shell—your own bash shell and container—right inside Visual Studio Code—Scott Hanselmanas Blog. (Year: 2017).*

Iann0036. (Dec. 16, 2020,). IANN0036/vscode-AWS-cloudshell. GitHub. https://web.archive.org/web/20201216235251/https://github.com/iann0036/vscode-aws-cloudshell#settings (Year: 2020).*

M. Ueno and Y. Imai, "SSH Kernel: A Jupyter Extension Specifically for Remote Infrastructure Administration," NOMS 2020-2020 IEEE/IFIP Network Operations and Management Symposium, Budapest, Hungary, 2020, pp. 1-5, doi: 10.1109/NOMS47738.2020. 9110404. (Year: 2020).*

\* cited by examiner

300

302 RECEIVE A REQUEST TO INITIATE A CLOUD SHELL ASSOCIATED WITH A SERVICE

304 IDENTIFY A CLOUD SHELL EXTENSION ASSOCIATED WITH THE SERVICE

306 EXECUTE AN EXTENSION ASSOCIATED WITH THE SERVICE

308 INITIATE A TERMINAL SESSION INCLUDING THE SET OF CONTEXT DATA

CLOUD SHELL EXTENSION FRAMEWORK

INCORPORATION BY REFERENCE; DISCLAIMER

The following application is hereby incorporated by reference: application Ser. No. 17/321,240 filed on May 14, 2021. The Applicant hereby rescinds any disclaimer of claim scope in the parent application(s) or the prosecution history thereof and advises the USPTO that the claims in this application may be broader than any claim in the parent application(s).

BACKGROUND

In many instances, a cloud service may require a client to interact with a service via a command line interface (CLI). Example services can include a bastion comprising a computing instance that serves as the public entry point for accessing a private network from external networks like the Internet or a container engine providing a managed, scalable, and highly available service that can be used to deploy containerized applications to the cloud.

A cloud shell can be executed between the cloud infrastructure computer and a client device to run the CLI for the service. However, existing cloud shell techniques are in need of improvements, especially with respect to user interaction.

SUMMARY

The present embodiments relate to a cloud shell extension framework. A first exemplary embodiment provides a method performed by a cloud infrastructure node for implementing a cloud shell extension framework. The method can include receiving, from a client device, a request to initiate a cloud shell. The request can be associated with a service. The method can also include identifying a cloud shell extension associated with the service. This can be performed responsive to receiving the request to initiate the cloud shell.

The method can also include executing the cloud shell extension associated with the service to obtain context data specific to the service. The method can also include initiating a terminal session with the client device. The initiation of the terminal session can include the obtained context data.

DETAILED DESCRIPTION

Figure 1:
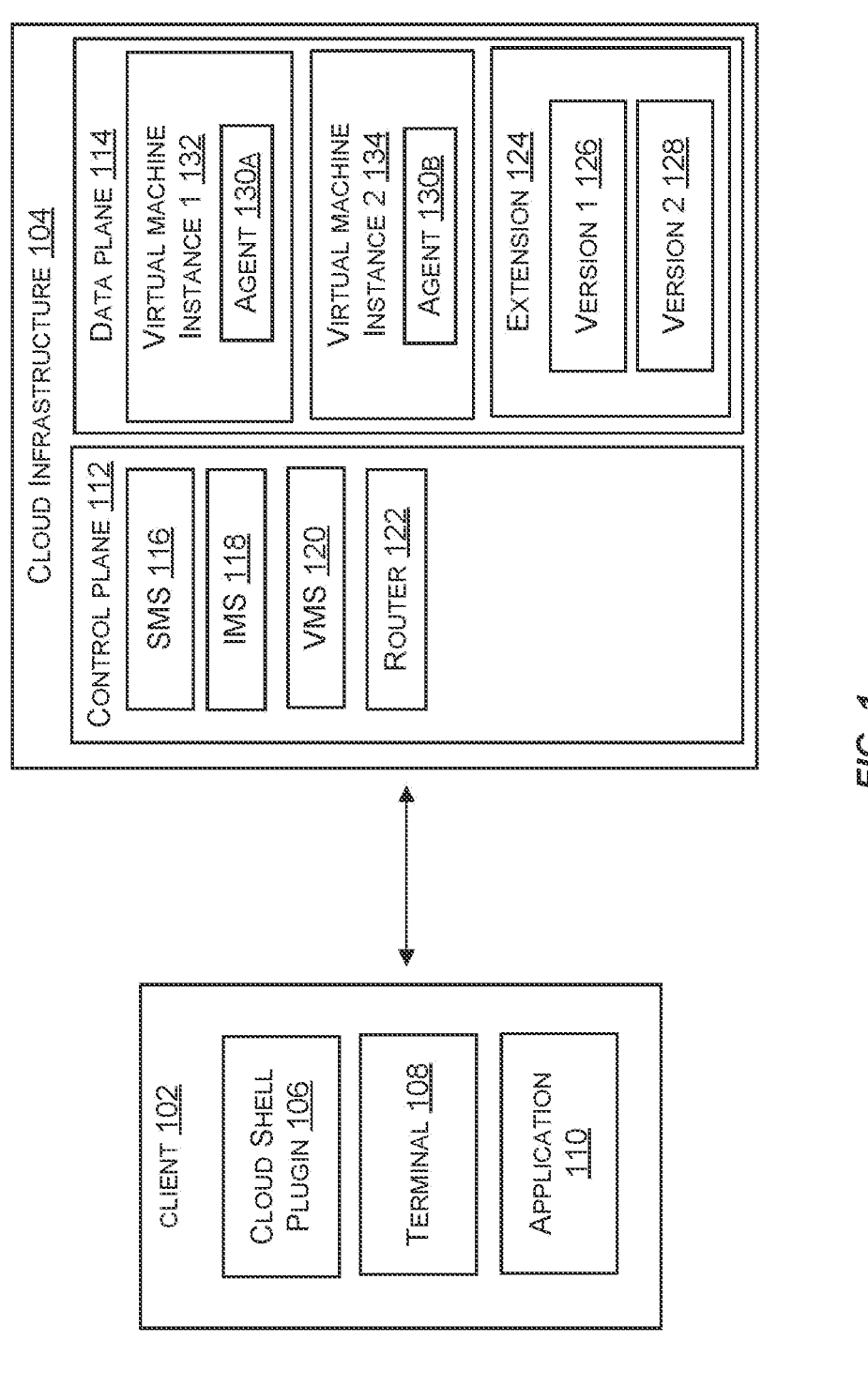
FIG. 1 is a block diagram illustrating an example system for implementing a cloud shell extension framework, according to at least one embodiment.

The present embodiments relate to implementing a cloud shell extension framework. A cloud infrastructure (CI) service can invoke a cloud shell from a console. However, many services may desire certain data specific to the service to be added for use in a terminal session. For example, a service may desire environment variables set by the client or have code downloaded from an external data source to prepare an environment for a terminal session. The cloud shell plugin framework as described herein can provide CI services (e.g., a bastion, a container engine, or the like) with an ability to obtain and execute preferred variables in obtained context data before the user is provided the terminal session.

A first example service can include a CI bastion service. The bastion can provide an operator with secure shell (SSH) access to hosts. A cloud shell session can start a SSH tunnel to a virtual machine instance specific to the CI bastion service. Another example service can include a container engine environment service. The container engine environment service can request a user to generate a cluster configuration file in a cloud shell, and the cloud shell session can start with the configuration file automatically generated.

The cloud shell extension can include a tool or script that can be used to obtain context data or pre-determined code for preparing an environment specific to the service prior to the user interaction with the environment. The cloud shell extension can allow for a service to register an extension in the cloud shell framework, and the extension can be invoked when a client initiates the cloud shell with the service. The extension can allow for the invoked service to forward context data, such as environment variables, to be set in the terminal session for the client.

As an illustrative example, a container engine CI service may be configured to pass on context as environment variables when invoking the cloud shell. The service can have an extension providing a listing of available environment variables to prepare the environment. A virtual machine (VM) instance at a CI device can be created for the terminal session, and selected environment parameters can be passed through a shell (e.g., bash) to tunnel the cloud shell to the VM instance. Tunneling a cloud shell to a specific VM instance can increase data security by providing access to a private network.

As described in greater detail below, an extension can include any of an initializer extension or an interactive extension. An initializer extension can execute code when the cloud shell is initialized. The initializer extension can set up variables at initialization of the cloud shell by setting environment variables or downloading specific files. For instance, the script can download code from the Internet and have the code available in the cloud shell or run a secure shell (SSH) proxy pointed to a VM instance specific to the service. After performing the tasks as specified in the extension, the initializer extension can exit the script and allow the remainder of the terminal session to be a cloud shell bash terminal communicating data between the client device and the terminal instance (e.g., VM instance).

An interactive extension can take over the cloud shell terminal session and execute during an entirety of the terminal session. In other words, the interactive extension can control input/output parameters during the terminal session, and only ends execution of the extension when the terminal session is terminated (e.g., based on a termination command provided by the client). The interactive extension can be used in cases where the extension prefers full control over input and output parameters obtained during the terminal session. An example of an interactive extension can include a bastion extension taking over the cloud shell terminal session and directing user input data to a bastioned instance.

The cloud shell plugin framework can define how CI services can initiate the cloud shell and execute scripts during initialization and termination of a terminal session. The CI service can start cloud shell and the cloud shell extension can execute an initiation script prior to providing any prompts to the client, and a termination script can be executed when the client requests termination of the cloud shell. The plugin scripts can be executed as a CI tenancy user, and an Identity and Access Management (IAM) policy set can apply to execution of commands associated with the plugin scripts. Execution of the plugin scripts can last for a portion of the terminal session duration or for the entire duration of the terminal session.

The CI services can set a number of variables to be passed onto the plugin scripts to control plugin behavior. In some instances, the CI services may be eligible to run commands automatically in a cloud shell (e.g., via a whitelist). In the event a cloud shell session is already running, when the CI services start cloud shell with a plugin execution, the client may obtain a notification that specifies that existing cloud shell session should be terminated first. This limitation may be removed once cloud shell support multiple tabs. CI services can have a plugin with access to the logs of the execution of their plugin in the cloud shell logs.

The extension passing data to the terminal instance can make it easier for the user to perform commands with provided context data. Rather than requiring manual entry of all context data or copying and pasting context data into a cloud shell terminal session, the present embodiments provide an extension that can automatically provide service-specific context data or provide prompts to provide context data to prepare an environment for a terminal session specific to the service.

Another example service can relate to a service to compute SSH key pairs. User commands can be computed to generate a SSH key pair (e.g., using openssl). A public key can be copied to compute a user interface when creating a terminal session instance, where the commands can run automatically in the cloud shell. A fourth service can relate to a functions environment that can request a user to execute a series of commands to setup the environment before deploying functions. The commands can be executed automatically in cloud shell.

FIG. 1 is a block diagram illustrating an example system 100 for implementing a cloud shell extension framework. As shown in FIG. 1, the system 100 can include a client device 102 and a cloud infrastructure (CI) 104. The client device 102 and CI 104 can communicate via suitable communication networks, such as the Internet, for example.

The client device 102 can include a cloud shell plugin 106, a terminal 108, and one or more applications (e.g., application 110). The cloud shell plugin 106 can include a plugin capable of interacting with the cloud infrastructure to establish the cloud shell. For instance, the cloud shell plugin 106 can interface the client device (and a specified CI service) to the cloud infrastructure via a session management service 116 executing in a control plane of the cloud infrastructure.

The cloud shell can include a web browser-based terminal (e.g., terminal 108) accessible from a client device. The cloud shell can provide access to a shell with a pre-authenticated command line interface (CLI) and other tools relating to cloud infrastructure service. The cloud shell can provide an ephemeral machine to use as a host for a shell. The cloud shell can execute a virtual machine running a bash shell which can be accessed through the client device. The cloud shell can come with a pre-authenticated CLI, set to the console tenancy home page region, as well as tools and utilities.

The cloud shell can connect to the CI node via an API. The client device 102 can include a listener running with a start command that can receive messages from a console or other plugins. In some instances, a session launched by a console plugin may not be tied to a console plugin that launched the session, and navigating to a different console plugin may not end the session.

The client device 102 can include a package that provides an API containing specific type definitions for each plugin. A cloud shell console plugin can check a source of a message before taking any action. Launching new cloud shell sessions with specific environment variables set can trigger a certain extension with two-way communication. Console plugins can perform actions like monitor the recently launched shell session. Listeners may be defined when a console plugin is started, so both cloud shell as well as console plugins wanting to communicate with the cloud shell may be configured to modify their initialization code.

In some instances, a state of a session can be monitored. The system can subscribe to the session using an identifier that is part of the session data, where a console plugin can monitor the session using the subscription. The system can monitor for an idle state, a connected state, a running state, a disconnected state, a terminating state, a terminated state, a closed state, etc.

The state of the session can be monitored for transitions between multiple states. For example, an idle state can be transitioned to a connected state upon initiation of the session. If a launch payload in initiating the session in invalid, the idle state can be transitioned to an invalid state. The invalid state can transition to a closed state responsive to receiving a session close indication (e.g., the client closing the session).

In the connected state, if the cloud shell is initiated and resolved, the state can transition to a running state. If a session close indication is detected in the connected state, the state can transition to a terminating state to initiate termination of the session. If the initiation of the cloud shell is rejected (e.g., a resolve failure is detected), the state can transition to a disconnected state.

In the running state, the cloud shell can be running. If the session close indication is detected in the running state, the state can transition to a terminating state to initiate termination of the session. In the running state, if the web socket is disconnected, the state can transition to a disconnected state.

In the disconnected state, if the session is reconnected, the state can transition to the connected state. If the session close indication is detected in the disconnected state, the state can transition to a terminating state to initiate termination of the session. In the terminating state, if the session is resolved, the state can transition to a terminated state. In the terminated state, when the session is closed, the state can transition to the closed state.

A cloud shell session package can limit which plugin launches a session type. In cloud shell, multiple listeners can be started, one for each plugin supported by the cloud shell. The namespace for each listener can match a name of the console plugin. The cloud shell can be launched as triggered using a backend as a service (BaaS) node.

Launching a cloud shell can include a BaaS launcher sending a launch message to a BaaS and cloud shell runtime node. The parameters in the launch message can include a namespace, a listener identifier, a payload, and a launch request ID. The payload can include a BaaS session, variables, etc. The BaaS and cloud shell runtime can send a message to a cloud shell where a message listener is created as part of a setup session collector.

The cloud shell can validate the received message and create a session ID for the cloud shell session. The cloud shell can send a message to the BaaS and cloud shell runtime including a session ID. The BaaS and cloud shell can send a message including the session ID to a BaaS message listener created by the BaaS launcher. The BaaS message listener can validate the message and send session data to the BaaS launcher.

In some embodiments, sessions can be bootstrapped by the cloud shell. A cloud shell plugin can request to add an event listener to a collector that is returned by a setup session collector. The cloud shell plugin can request and receive listeners from the collector.

The cloud shell plugin can send a request to start listeners at a cloud shell runtime and receive a message to handle a new command from the cloud shell runtime. The cloud shell plugin can send a render command to the bootstrap session to start a session. The bootstrap session can request to add a session to the session context that can store all registered sessions.

The session context can render the session and render the payload to a session react component that is used as a basis to manage a session. The payload render message can be sent to a connection manager to manage the connection state. The connection manager can send a request to create a host to a cloud shell API that can return a work request ID. The connection manager can send a request for the work request and receive a host identifier from the cloud shell API. The connection manager can request a host and receive a host status from the cloud shell API. The connection manager can repeat host polling until the host is ready and create a terminal when the host is ready.

As noted herein, a new extension can be added to the CI node. A new extension can be provided for a specific service. A client providing the new extension can be whitelisted to launch a new extension and be able to override plugins for a console. The client can test the new extension using a session test plugin and add the plugin to a cloud shell session package comprising a plurality of extensions.

The terminal 108 can include a command line interface (CLI) providing an input for data and a display to output received data. The terminal can provide an input/output interface for the cloud shell and terminal session as described herein.

The client device 102 can include an application 110. The application 110 can be associated with a service and can identify the service when requesting execution of a cloud shell extension specific to the service. For instance, the application 110 can provide a request to initiate the cloud shell and execute the extension specific to the service.

The cloud infrastructure 104 can include a control plane 112 and a data plane 114. The control plane 112 can include a session management service (SMS) 116 that handles the front end control plane requests. The SMS 116 can interact with a cloud shell plugin and the data plane virtual machine instance to initiate the terminal session and monitor data plane virtual machines. The instance management service (IMS) 118 can manage pools of data plane virtual machines that are used by the service. For instance, the IMS 118 can obtain an instance from the SMS and terminate the instance responsive to the terminal session being ended.

The control plane 112 can include a volume management service (VMS) 120. The VMS 120 can manage a home directory and provide home directory data to the SMS 116. The router 122 can manage communication for the terminal over web sockets between the client device and an agent.

The data plane can include multiple virtual machines (e.g., virtual machine 1 132, virtual machine 2 134). The virtual machines can be created by IMS 118 and can be managed by SMS 16. The data plane 114 can include one or more agents 130a-b. The agent 130 can include an application that runs on the data plane virtual machine and is responsible for receiving web socket traffic and sending traffic to the cloud shell running on the virtual machine instance. Each agent 130a-b can be associated with a virtual machine instance for each terminal session and manage virtual machine instances (e.g., virtual machine 1 132, virtual machine 2 134) running on the data plane 114. For example, the data plane 114 can include multiple virtual machines running (e.g., virtual machine 1 132, virtual machine 2 134). Each agent can manage one or more extensions 124.

The data plane 114 can access a number of extensions 124. An extension 124 can include code (e.g., a tool/script) specific to a service to provide context data (e.g., environment variables) to a terminal session. The extension 124 can be installed in a boot volume of an instance in the data plane 114. Each extension 124 for a service can include multiple versions. For example, a first version of the extension 126 can include an earlier instance of the extension and a second version of the extension 128 can include a more recent instance of the extension. In some embodiments, if a most recent version of the extension (e.g., 128) fails to execute, the system can retrieve an earlier version of the extension (e.g., 126) and execute that version.

Figure 2:
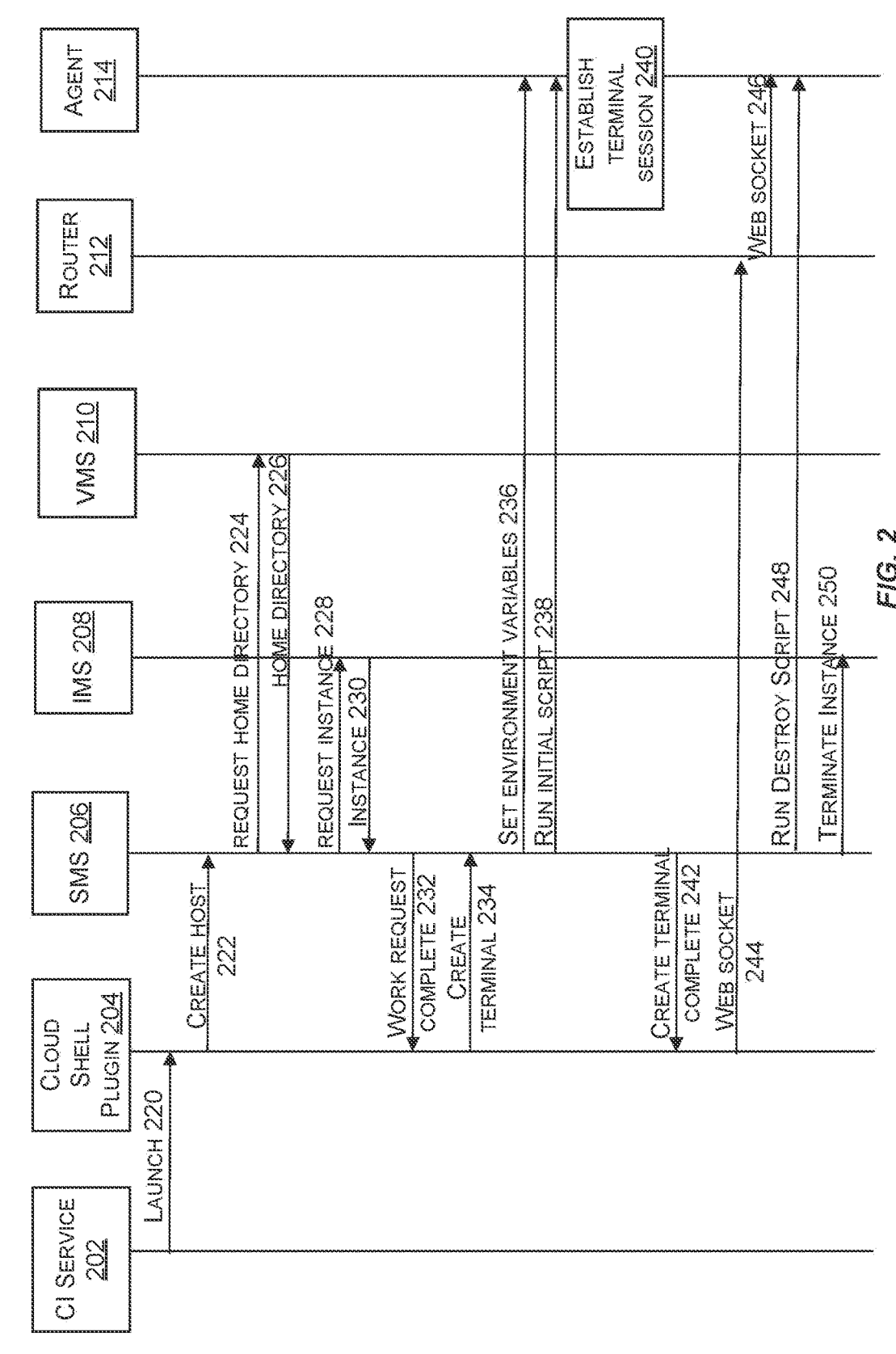
FIG. 2 is a signaling process for implementing a cloud shell extension framework, according to at least one embodiment.

FIG. 2 is a signaling process 200 for implementing a cloud shell extension framework. At 220, the CI service 202 can send a request to launch a terminal session to a cloud shell plugin 204. The request can include a request to initiate a cloud shell associated with the service. The request to launch the terminal session can specify a particular CI service (e.g., bastion, a container engine).

At 222, the cloud shell plugin 204 can send a request to create a host to the SMS 206. The SMS 206 can initiate a process to create a host that can be used to initiate the cloud shell. The host creation process can include requesting a home directory and requesting an instance. At 224, the SMS 206 can request a home directory from a VMS 210. At 226, the VMS 210 can provide the home directory to the SMS 206. At 228, the SMS 206 can request an instance from the IMS 208. At 230, the IMS 208 can provide the instance to the SMS 206.

At 232, the SMS 206 can send a work request complete message to the cloud shell plugin 204. The work request complete message can specify that a host has been created.

The extension can be obtained at the cloud shell plugin 204 and the extension can be initialized with the cloud shell.

At 234, the cloud shell plugin 204 can request to create a terminal to the SMS 206. The request to create a terminal can include a request to pass context data according to the extension to the agent 214. At 236, the SMS 206 can send environment variables to the agent 214. The environment variables can be used to prepare an environment in a terminal session according to the extension.

At 238, the SMS 206 can send a request to run an initial script to the agent 214. At block 240, the agent 214 can establish the terminal session. The terminal session can allow for data communication between the agent 214 and cloud shell plugin 204 via a router 212.

At 242, the SMS 206 can send a create terminal complete message to the cloud shell plugin 242 indicating that the terminal session is established. At 244, the cloud shell plugin 204 can send web socket data to the router 212. At 246, the router 212 can forward the web socket data to the agent 214. The web socket data can include data communicated during the terminal session.

At 248, the SMS 206 can run a destroy script to the agent 214. The destroy script can be run responsive to detecting a request to end a terminal session. At 250, the SMS 206 can send a request to terminate the instance to the IMS 208 to terminate the terminal session instance.

Figure 3:
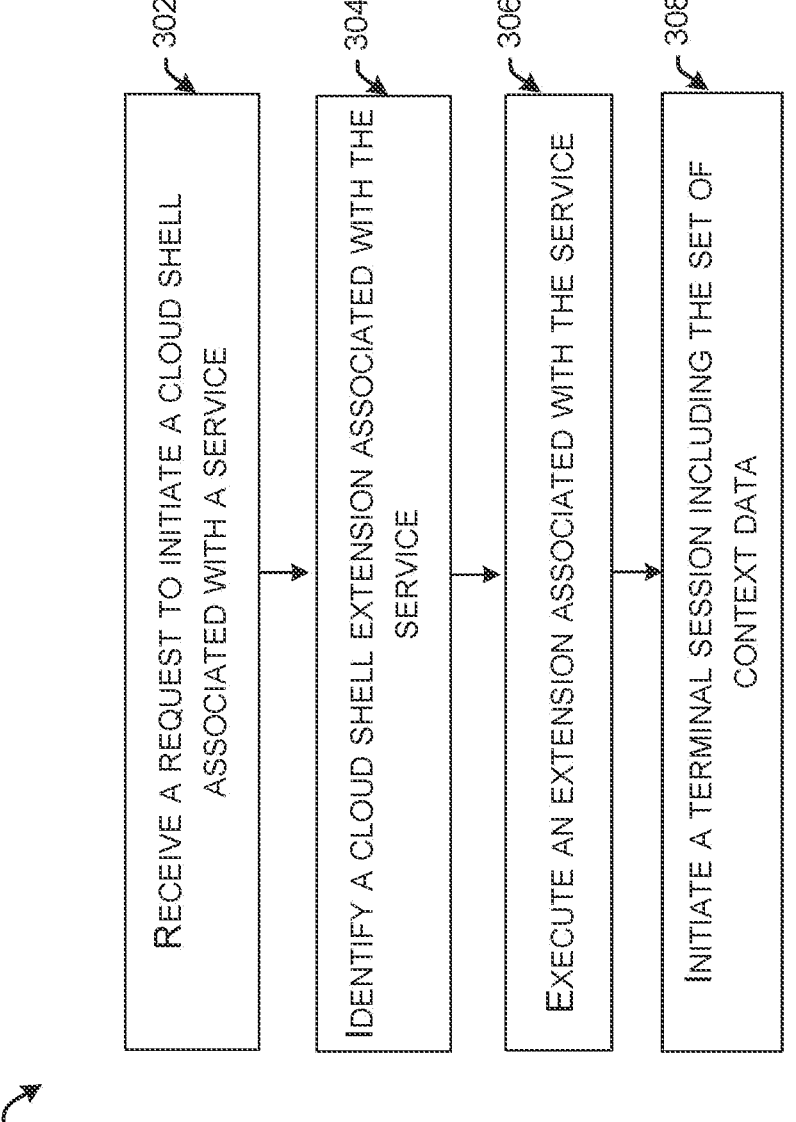
FIG. 3 is a block diagram illustrating a method for implementing a cloud shell extension framework, according to at least one embodiment.

FIG. 3 is a block diagram 300 illustrating a method for implementing a cloud shell extension framework. A cloud infrastructure node (e.g., a computing device or series of interconnected computing devices) can interact with a client device to execute a cloud shell extension between the client device and an instance at the cloud infrastructure node.

At block 302, the method can include receiving a request to initiate a cloud shell. The request can specify a service that is associated with an extension unique to the service. For instance, the request can be sent via an application on the client device associated with the service to initiate the cloud shell and establish a terminal session.

At block 304, the method can include identifying a cloud shell extension associated with the service. The cloud infrastructure node can receive and maintain a number of extensions unique to each service. For instance, the request to initiate the cloud shell can include an identifier for the service, and the cloud infrastructure node can identify an extension that corresponds to the identifier. In some embodiments, the cloud infrastructure node can identify and execute a most recent version of the extension relating to the service.

In some embodiments, initiating a terminal session can include creating a virtual machine instance for execution of the terminal session by an agent executing in a data plane of the cloud infrastructure node. Web socket data can be transmitted between the virtual machine instance and the client device during the terminal session.

At block 306, the method can include executing the cloud shell extension associated with the service. The extensions can include code to download content or obtain context data to prepare an environment with data specific to the service during the terminal session. For example, the extension can provide a listing of environment variables that can be provided or can be selected by the client prior to being provided to a virtual machine instance to be added to the terminal session. As another example, the extension can take over a terminal session and direct data communication between the virtual machine instance and the client device. The extension can include any of an initializer extension or an interactive extension as described herein.

In some embodiments, executing the cloud shell extension can include an initializer extension that can provide a request to select any of a plurality of environment variables specific to the service. For example, rather than having to manually type in all environment variables for the client and the service, a listing of variables can be provided to the client to be selected by the client. One or more selected environment variables from the client device can be obtained. After initiating the terminal session with the client device, the execution of the cloud shell extension can be terminated, directing the client to the terminal session that includes the environment variables selected by the client. In other embodiments, the environment variables can be pre-selected specific to the service and provided to the virtual machine instance to prepare the environment for the terminal session.

In some embodiments, executing the cloud shell extension can include an initializer extension that can download content from an external node (e.g., a server accessible via the Internet acting as a code repository) according to a script corresponding with the cloud shell extension. The downloaded content can be included as part of the context data.

In some embodiments, executing the cloud shell extension can include an interactive extension that can execute an interactive extension with the terminal session. The interactive extension can be configured to request input parameters from the client device and receive one or more input parameters from the client device during the terminal session, the one or more input parameters included in the context data. For example, the interactive extension can execute a secure shell proxy to tunnel data from the client device to a specified virtual machine instance as specified in the cloud shell extension.

In some instances, the system can determine that execution of a first version of the cloud shell extension has failed. Responsive to determining that execution of the first version of the cloud shell extension has failed, a second version of the cloud shell extension with an earlier version instance that the first version of the cloud shell extension can be identified and executed.

At block 308, the method can include initiating a terminal session with the client device. The initiation of the terminal session can include the obtained context data. For example, responsive to executing the extension and obtaining environment variables, the environment variables can be received at the virtual machine instance and can be used to prepare the environment for the terminal session. The terminal session can allow for web socket data to be transmitted between the virtual machine instance and the client device.

The client can initiate a termination of the terminal session by preforming a termination action (e.g., close terminal, enter termination command). Responsive to detecting a request to terminate the terminal session, a shutdown script can be executed to end the terminal session and remove the virtual machine instance.

Figure 4:
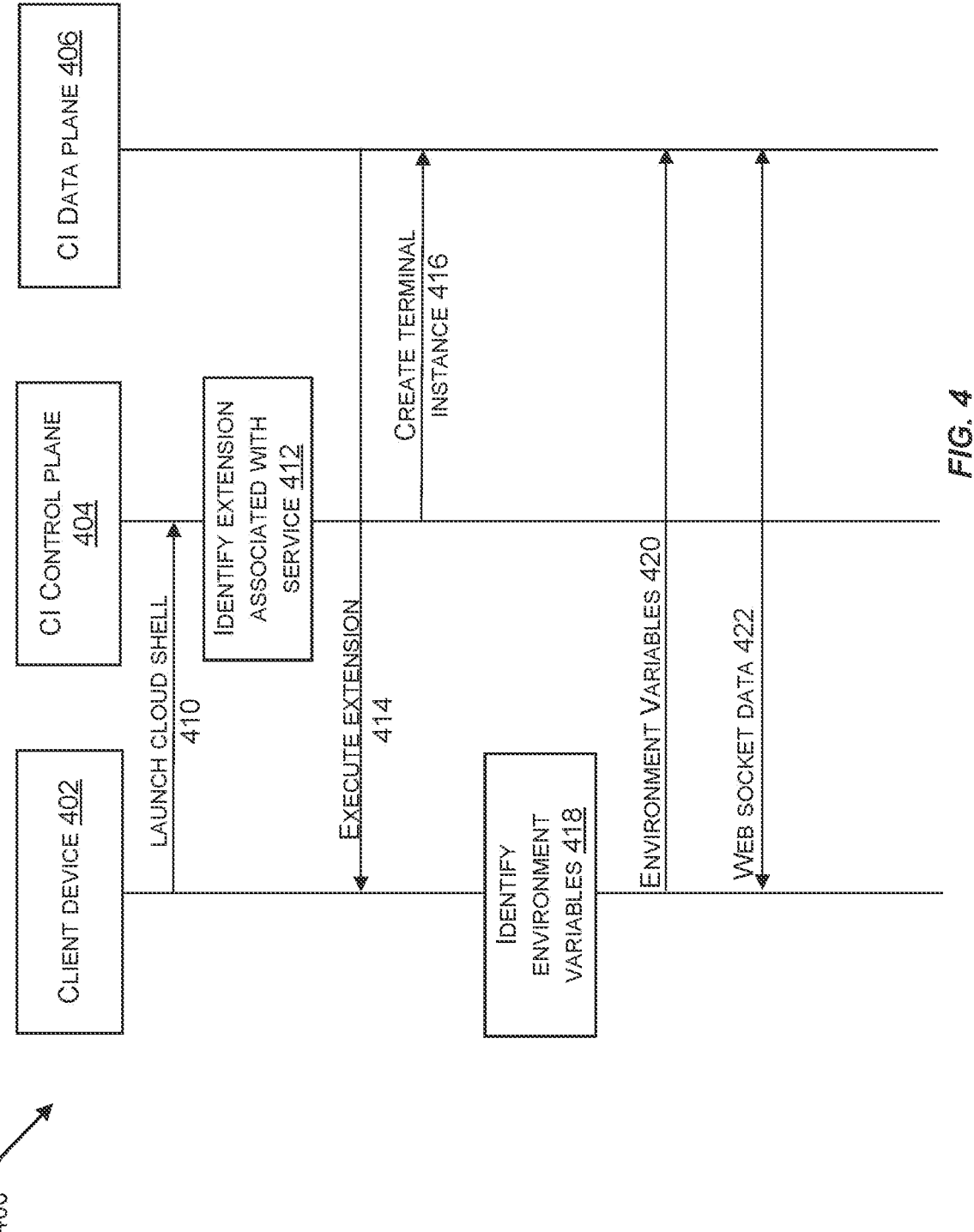
FIG. 4 is a signaling process of executing an example initializer extension, according to at least one embodiment.

FIG. 4 is a signaling process 400 for executing an example initializer extension. As noted herein, the initializer extension can obtain context data and pass the context data to a virtual machine instance prior to directing the client to the terminal session.

At 410, the client device 402 can send a request to launch a cloud shell to a CI control plane 404. The request to launch a cloud shell can identify a service that can be used to identify a corresponding cloud shell extension.

At block 412, the CI control plane 404 can identify an extension associated with the service. The CI node can include a plurality of extensions and an extension corresponding with the eservice can be identified using an identifier specific to the service.

At 414, the CI data plane 406 can execute the extension at the client device 402. Particularly, a cloud shell plugin at the client device 402 can execute the extension. The extension can download content from an external data source or provide context data to the CI data plane 406 for implementation of the extension.

At 416, the CI control plane 404 can provide a request to create a terminal instance to the CI data plane 406. The CI data plane 406 can include an agent capable of establishing a virtual machine instance that can establish a terminal session.

At block 418, environment variables can be identified. The environment variables can include variables specific to the client and/or the service to prepare an environment with client/service specific data during the terminal session. In some embodiments, the extension can provide a listing of environment variables to the client device 402 for the client to select environment variables to be provided to the terminal session.

At 420, the environment variables can be provided to the CI data plane 406. The environment variables can be provide context to the terminal session to increase user experience when in the terminal session. After the initiation of the terminal session, an initializer extension script can be terminated.

At 422, web socket data can be transmitted between the client device 402 and the CI data plane 406 during the terminal session. The web socket data can be routed between client device 402 and the CI data plane 406 via a router.

Figure 5:
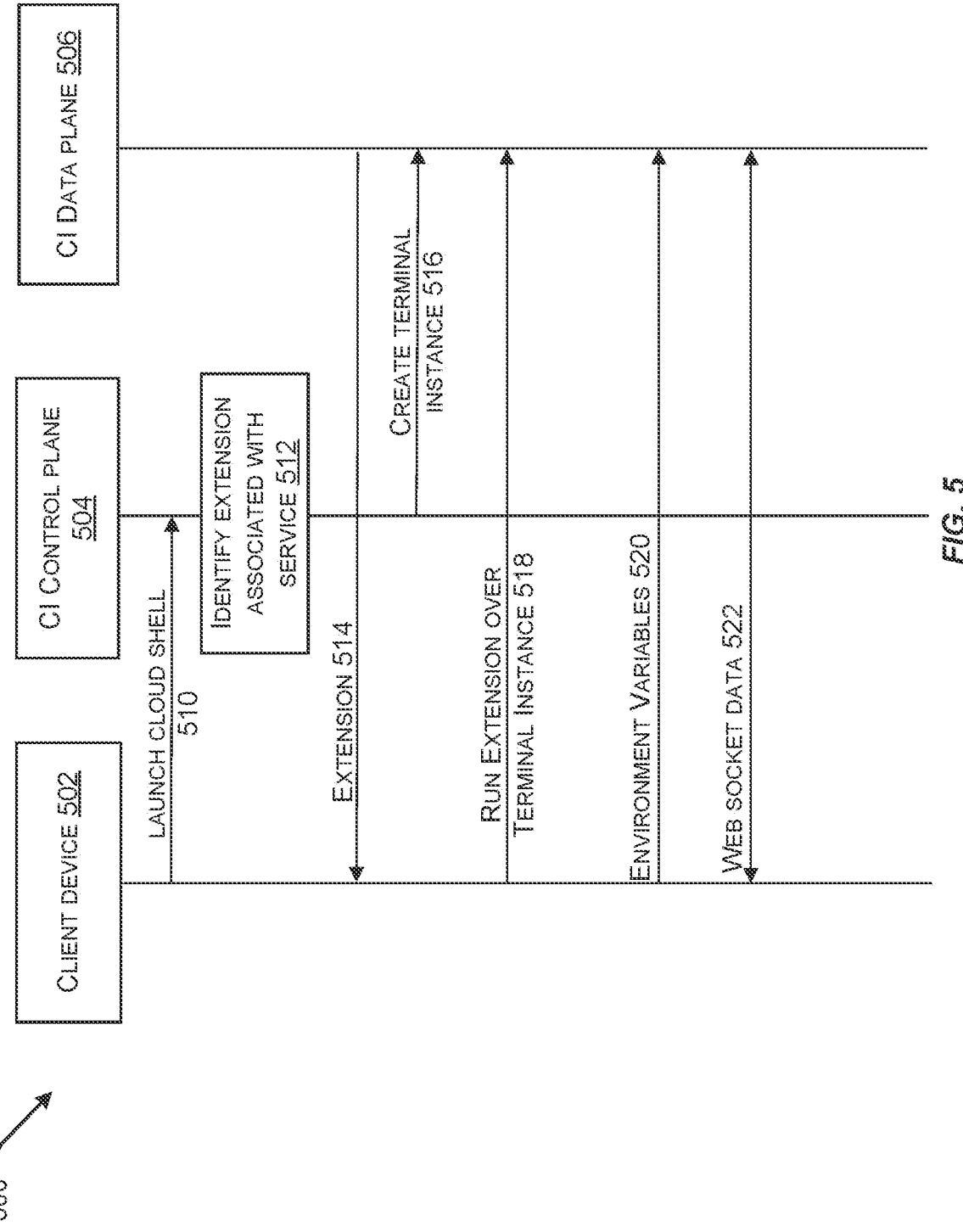
FIG. 5 is a signaling process of executing an example interactive extension, according to at least one embodiment.

FIG. 5 is a signaling process 500 for executing an example interactive extension. As noted herein, the interactive extension can take over the terminal session and provide context data during the terminal session.

At 510, the client device 502 can send a request to launch a cloud shell to a CI control plane 504. The request to launch a cloud shell can identify a service that can be used to identify a corresponding cloud shell extension.

At block 512, the CI control plane 504 can identify an extension associated with the service. The CI node can include a plurality of extensions and an extension corresponding with the eservice can be identified using an identifier specific to the service.

At 514, the CI data plane 506 can execute the extension at the client device 502. Particularly, a cloud shell plugin at the client device 502 can execute the extension. The extension can download content from an external data source or provide context data to the CI data plane 506 for implementation of the extension.

At 516, the CI control plane 504 can provide a request to create a terminal instance to the CI data plane 506. The CI data plane 506 can include an agent capable of establishing a virtual machine instance that can establish the terminal session.

At 518, the extension can be ran over the terminal instance. The extension can take over the terminal instance and control input/output prompts during the terminal session.

At 520, the environment variables can be provided to the CI data plane 506. The environment variables can be provided prior to providing the terminal session to the client device 502. In some embodiments, the extension can provide a listing of environment variables to the client device 502 for the client to select environment variables to be provided during the terminal session.

At 522, web socket data can be transmitted between the client device 502 and the CI data plane 506 during the terminal session. The web socket data can be routed between client device 502 and the CI data plane 506 via a router.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
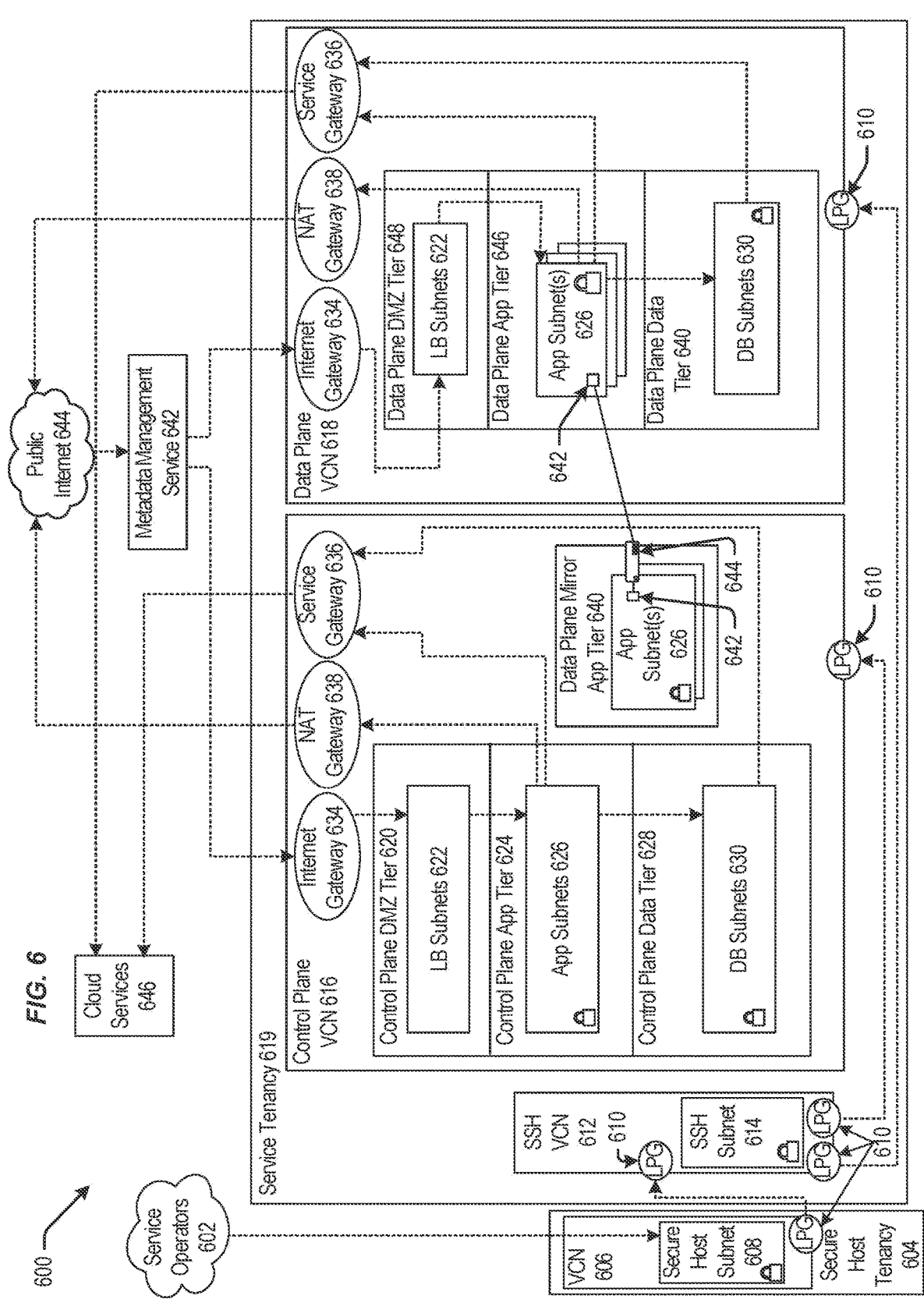
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
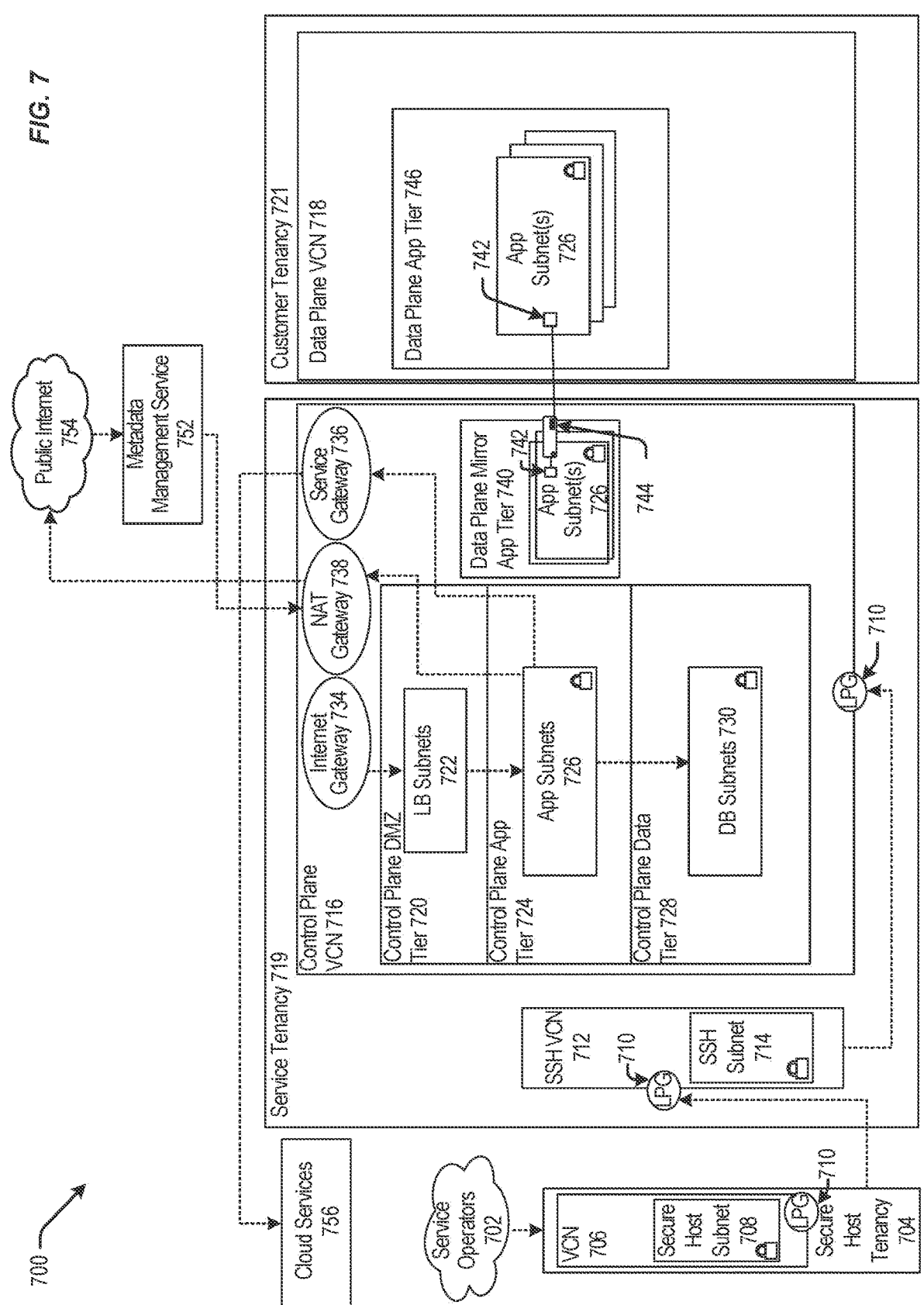
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
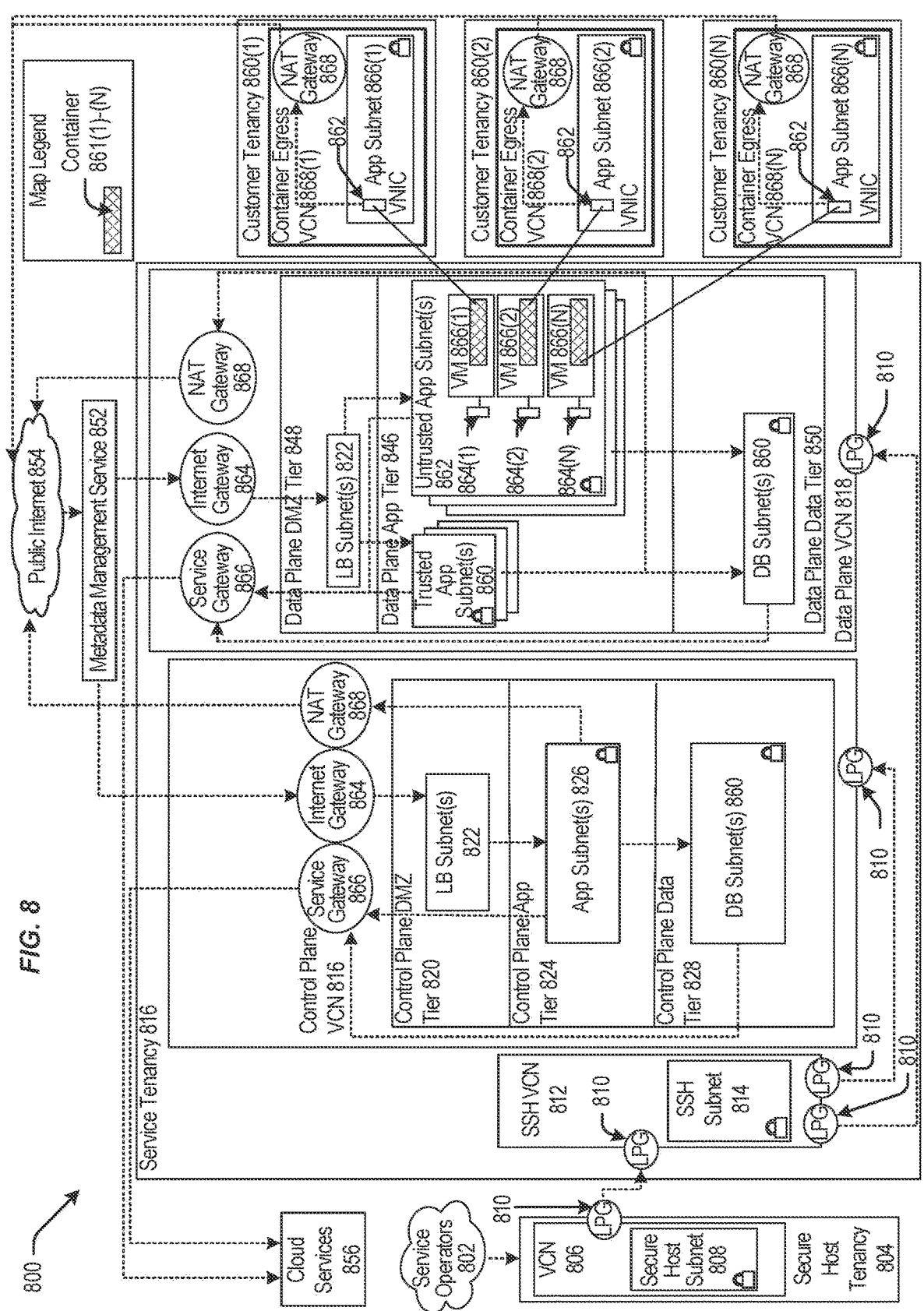
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
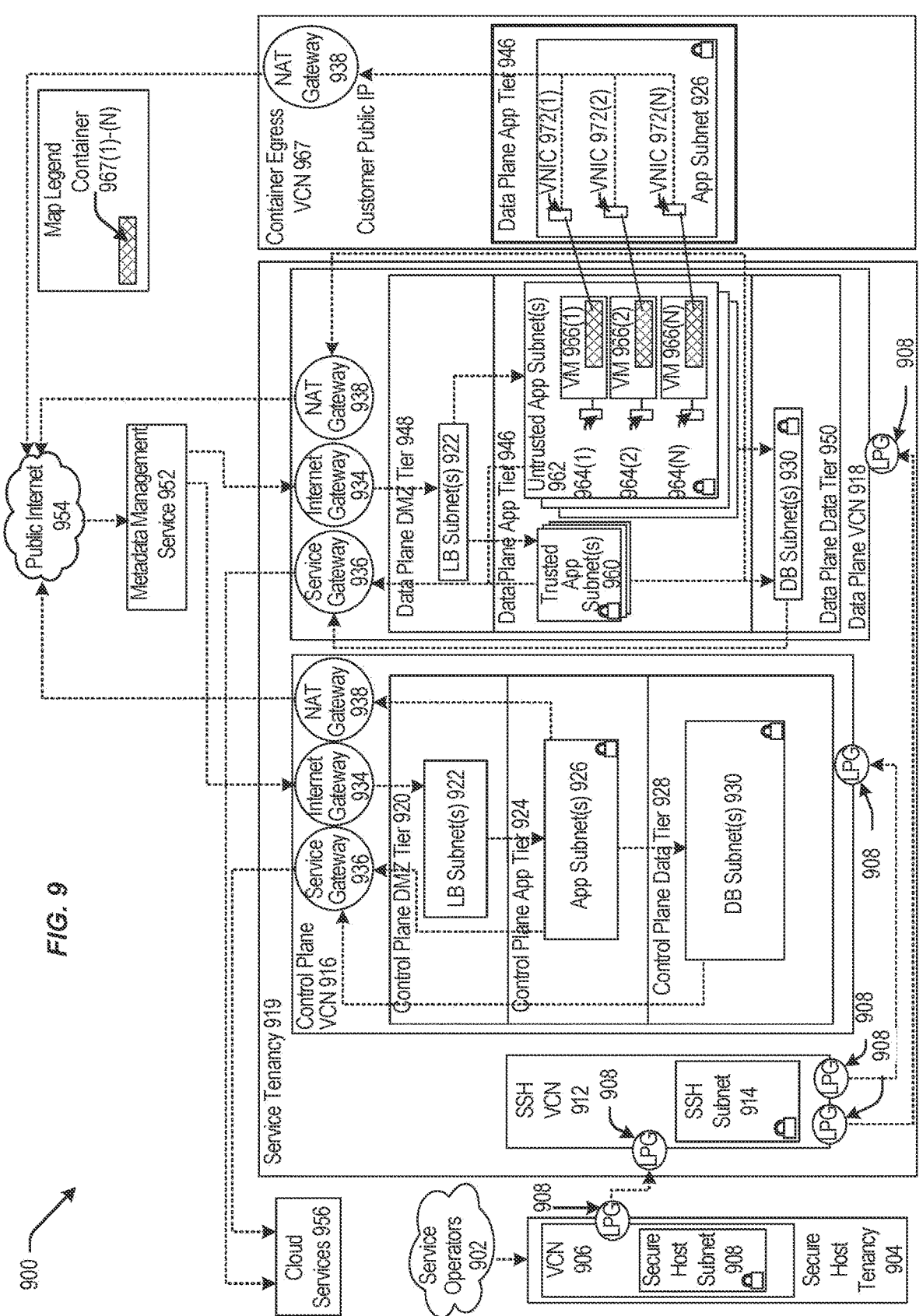
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
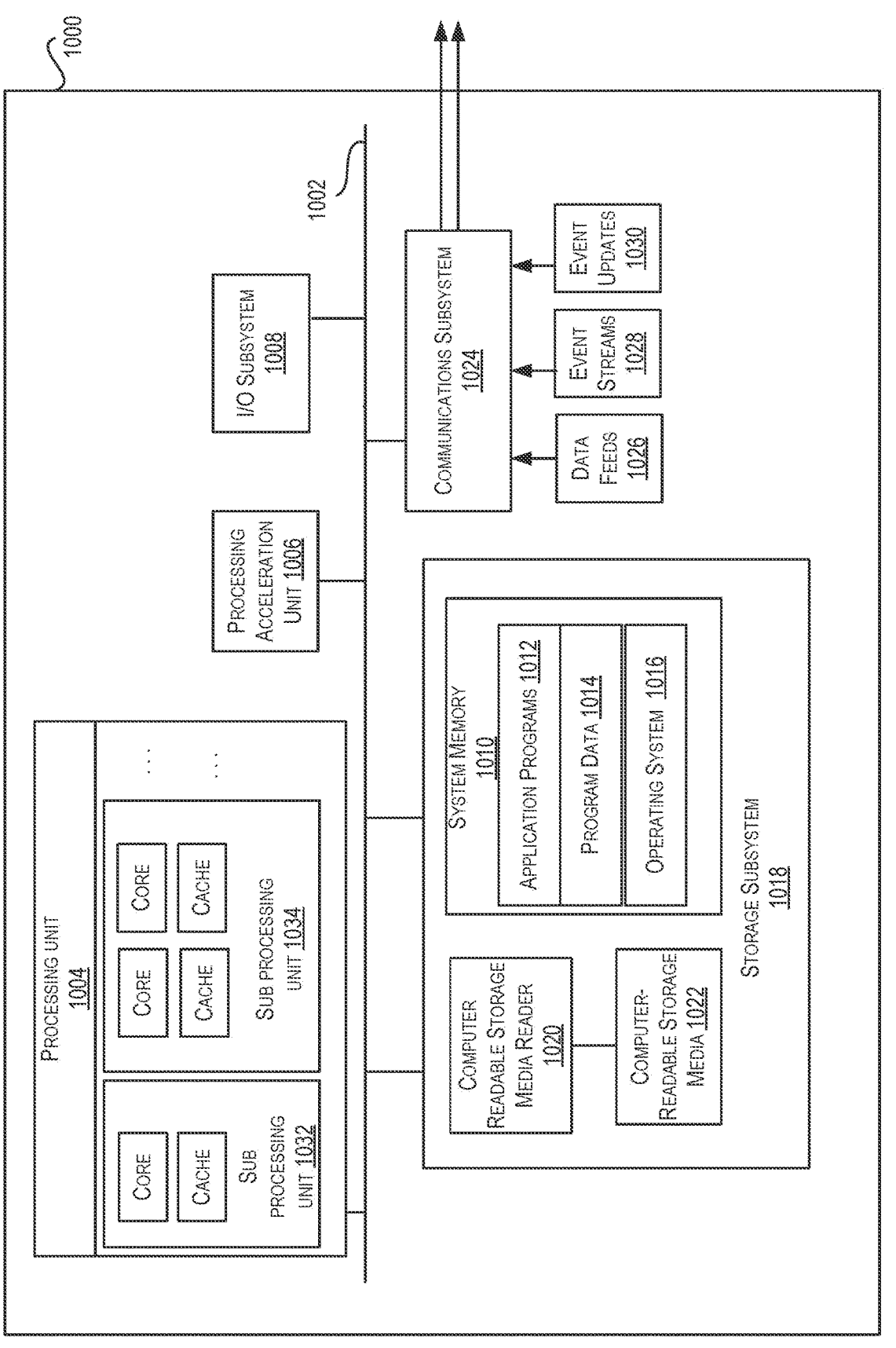
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method performed by a cloud infrastructure node for implementing a cloud shell extension framework, the method comprising:
  receiving, from a client device, a request to initiate a cloud shell, the request associated with a service;
  responsive to receiving the request to initiate the cloud shell, identifying a cloud shell extension associated with the service;
  executing the cloud shell extension associated with the service, wherein the cloud shell extension includes an initializer extension configured to provide, to a terminal session, context data comprising a plurality of environment variables specific to the service;
  initiating the terminal session with the client device, wherein the terminal session is initiated using the context data provided by the initializer extension;
  providing, to the client device, the plurality of environment variables specific to the service;
  obtaining one or more selected environment variables of the plurality of environment variables from the client device; and terminating the execution of the initializer extension responsive to the initiation of the terminal session with the client device.

2. The method of claim 1, further comprising:
  creating, by an agent of a data plane of the cloud infrastructure node, a virtual machine instance for execution of the terminal session, wherein web socket data is configured to be transmitted between the virtual machine instance and the client device during the terminal session.

3. The method of claim 2, further comprising:
  detecting a termination of the terminal session; and
  executing a shutdown script to end the terminal session.

4. The method of claim 1, wherein the cloud shell extension includes an interactive extension, wherein the execution of the interactive extension is terminated responsive to detecting a termination of the terminal session.

5. The method of claim 1, further comprising:
  downloading content from an external node according to a script corresponding with the cloud shell extension, wherein the context data includes the downloaded content.

6. The method of claim 1, wherein executing the cloud shell extension further comprises:
  executing a secure shell proxy to tunnel data from the client device to a specified virtual machine instance specific to the service.

7. The method of claim 1, wherein identifying the cloud shell extension associated with the service further comprises:
  determining that execution of a first version of the cloud shell extension has failed;
  responsive to determining that execution of the first version of the cloud shell extension has failed, identifying a second version of the cloud shell extension with an earlier version instance that the first version of the cloud shell extension to be executed; and
  executing the second version of the cloud shell extension.

8. A method performed by a cloud infrastructure node for implementing a cloud shell extension framework, the method comprising:
  receiving, from a client device, a request to initiate a cloud shell, the request associated with a service;
  responsive to receiving the request to initiate the cloud shell, identifying a cloud shell extension associated with the service;
  creating a virtual machine instance for implementation of a terminal session, wherein web socket data is transmitted between the virtual machine instance and the client device during the terminal session;
  initiating the terminal session with the client device;
  executing the cloud shell extension associated with the service, wherein the cloud shell extension includes an interactive extension configured to run during the terminal session, to request context data comprising one or more input parameters from the client device, and to receive the context data comprising the one or more input parameters from the client device during the terminal session; and
  terminating the execution of the interactive extension responsive to detecting a termination of the terminal session.

9. The method of claim 8, wherein the cloud shell extension includes an initializer extension, wherein executing the cloud shell extension further comprises:
  providing, to the client device, a plurality of environment variables specific to the service;

obtaining one or more selected environment variables of the plurality of environment variables from the client device, wherein the one or more selected environment variables are included in the context data; and terminating the execution of the cloud shell extension responsive to the initiation of the terminal session with the client device.

10. The method of claim 9, further comprising:

downloading content from an external node according to a script corresponding with the cloud shell extension, wherein the downloaded content is included as part of the context data.

11. The method of claim 8, further comprising:

detecting a termination of the terminal session; and executing a shutdown script to end the terminal session.

12. The method of claim 8, wherein executing the cloud shell extension further comprises:

executing a secure shell proxy to tunnel data from the client device to a specified virtual machine instance specific to the service.

13. The method of claim 8, wherein identifying the cloud shell extension associated with the service further comprises:

determining that execution of a first version of the cloud shell extension has failed;

responsive to determining that execution of the first version of the cloud shell extension has failed, identifying a second version of the cloud shell extension with an earlier version instance that the first version of the cloud shell extension to be executed; and executing the second version of the cloud shell extension.

14. A cloud infrastructure node comprising:

one or more hardware processors; and one or more non-transitory computer-readable media; and program instructions stored on the one or more non-transitory computer-readable media that, when executed by the one or more hardware processors, cause the one or more processors to:

receive a request to initiate a cloud shell from a client device, the request associated with a service;

identify a cloud shell extension associated with the service;

execute the cloud shell extension associated with the service, wherein the cloud shell extension is configured to at least one of: identify context data specific to the service or download the context data specific to the service from an external data source, the context data comprising one or more environment variables for preparing an environment in a terminal session;

provide the context data specific to the service to a virtual machine instance for executing the terminal session with the client device;

initiate the terminal session between the client device and the virtual machine instance, wherein the context data modifies at least one aspect of the terminal session; and terminate the execution of the cloud shell extension responsive to initiating the terminal session with the client device.

15. The cloud infrastructure node of claim 14, wherein the cloud shell extension includes an initializer extension, wherein said execute the cloud shell extension further comprises:

provide a request to select one or more environment variables from a plurality of environment variables specific to the service to the client device; and obtain one or more selected environment variables from the client device, wherein the context data includes the one or more selected environment variables.

16. The cloud infrastructure node of claim 14, wherein the cloud shell extension includes an interactive extension, wherein said execute the cloud shell extension further comprises:

execute the interactive extension with the terminal session, wherein the interactive extension is configured to request input parameters from the client device and receive one or more input parameters from the client device during the terminal session, the context data including the one or more input parameters.

17. The cloud infrastructure node of claim 14, wherein said execute the cloud shell extension further comprises:

execute a secure shell proxy to tunnel data from the client device to a specified virtual machine instance corresponding to the service.

* * * * *